(12) United States Patent
Lambri et al.

(10) Patent No.: US 10,995,926 B2
(45) Date of Patent: May 4, 2021

(54) HEADLIGHT FOR A VEHICLE

(71) Applicant: PIAGGIO & C. S.P.A., Pontedera (IT)

(72) Inventors: Marco Lambri, Pontedera (IT); Mirko Zocco, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 0 days.

(21) Appl. No.: 16/760,058

(22) PCT Filed: Nov. 2, 2018

(86) PCT No.: PCT/IB2018/058623
§ 371 (c)(1),
(2) Date: Apr. 29, 2020

(87) PCT Pub. No.: WO2019/087142
PCT Pub. Date: May 9, 2019

(65) Prior Publication Data
US 2020/0355339 A1   Nov. 12, 2020

(30) Foreign Application Priority Data
Nov. 6, 2017  (IT) .......................... 102017000125832

(51) Int. Cl.
*F21S 41/43* (2018.01)
*F21S 41/663* (2018.01)
(Continued)

(52) U.S. Cl.
CPC ................ *F21S 41/43* (2018.01); *B60Q 1/04* (2013.01); *F21S 41/145* (2018.01);
(Continued)

(58) Field of Classification Search
CPC .. F21S 41/40; F21S 41/43; F21S 41/50; F21S 43/14; F21W 2103/55
(Continued)

(56) References Cited

U.S. PATENT DOCUMENTS 7,303,319 B2 * 12/2007 Holtz .................... F21S 41/275
  362/462
9,400,090 B2 *  7/2016 Arita ..................... F21S 41/663
(Continued)

FOREIGN PATENT DOCUMENTS

DE         10311688 A1    9/2004
DE    202017004932 U1   11/2017
(Continued)

OTHER PUBLICATIONS

International Search Report for corresponding application PCT/IB2018/058623 filed Nov. 2, 2018; dated Mar. 8, 2019.
Written Opinion for corresponding application PCT/IB2018/058623 filed Nov. 2, 2018; dated Mar. 8, 2019.

*Primary Examiner* — Christopher M Raabe
(74) *Attorney, Agent, or Firm* — Cantor Colburn LLP

(57) ABSTRACT

A headlight (1) comprising: a parabolic reflector (2) comprising an opening (2a), said parabolic reflector (2) being configured to reflect and distribute in a homogenous manner toward the opening (2a) at least a light beam (5a,5b); a transparent shield (3) to close said opening (2a); a bearing partition (4) arranged in the parabolic reflector (2), so to define a first sector of the reflector (15) and a second sector of the reflector (16) opposed to each other with respect to said bearing partition (4); at least a light source configured to generate: a first light beam (5a) pointed toward said first sector of the reflector (15); a second light beam (6a) pointed toward said second sector of the reflector (16); a third light beam (7a); a mask (8) comprising at least a partially transparent window (9) arranged so that said third light beam illuminates said window (9).

10 Claims, 3 Drawing Sheets

(51) Int. Cl.
*F21S 41/32* (2018.01)
*F21S 41/145* (2018.01)
*B60Q 1/04* (2006.01)
*F21Y 115/10* (2016.01)
*F21W 107/17* (2018.01)
*F21W 102/13* (2018.01)
*F21W 103/55* (2018.01)
*B62J 6/022* (2020.01)

(52) U.S. Cl.
CPC ............ *F21S 41/321* (2018.01); *F21S 41/663* (2018.01); *B62J 6/022* (2020.02); *F21W 2102/13* (2018.01); *F21W 2103/55* (2018.01); *F21W 2107/17* (2018.01); *F21Y 2115/10* (2016.08)

(58) Field of Classification Search
USPC .......................................................... 362/463
See application file for complete search history.

(56) References Cited

U.S. PATENT DOCUMENTS

| | | | |
|---|---|---|---|
| 9,909,747 B2 * | 3/2018 | Salter | F21S 41/692 |
| 2004/0213014 A1 * | 10/2004 | Koike | F21K 9/00 |
| | | | 362/545 |
| 2005/0068787 A1 * | 3/2005 | Ishida | F21S 41/663 |
| | | | 362/538 |
| 2007/0171665 A1 | 7/2007 | Finch | |
| 2010/0194276 A1 * | 8/2010 | Okubo | F21S 41/155 |
| | | | 315/82 |
| 2012/0294024 A1 * | 11/2012 | Peck | F21S 41/331 |
| | | | 362/516 |
| 2013/0135886 A1 * | 5/2013 | Tanaka | F21S 41/39 |
| | | | 362/516 |

FOREIGN PATENT DOCUMENTS

| | | |
|---|---|---|
| EP | 3112213 A1 | 1/2017 |
| JP | 2006156301 A | 6/2006 |

* cited by examiner

HEADLIGHT FOR A VEHICLE

FIELD OF THE INVENTION

The present invention relates to vehicle headlights and, in particular, it relates to a headlight with LED technology or the like, preferably, but not exclusively, used in motor vehicles such as, for example, motorbikes and/or mopeds.

BACKGROUND ART

The headlights of a vehicle are designed to emit different light beams which are mainly divided into: position light, low beam and high beam.

Headlights comprising a plurality of LED are known, suitably arranged in a reflective cap to generate the different types of light beams.

In a motor vehicle the need is felt to improve the efficiency and the effectiveness of the light beams produced by the LEDs so as to improve night and day visibility. In particular, the need is felt to optimize the homogeneity of the light beam, and to recreate in the headlight at least a commercial symbol/logo which remains evident and which also acts as lighting.

SUMMARY OF THE INVENTION

It is therefore an object of the present invention to provide a headlight for a vehicle which is structurally efficient so as to homogenize the light beam produced.

It is also an object of the present invention to provide a headlight for a vehicle which is constructively simple and cost effective to manufacture.

It is another object of the present invention to provide a vehicle, in particular a motor vehicle, comprising the aforesaid headlight, which achieve the same objects.

These and other objects are achieved by a headlight for a vehicle comprising:
a parabolic reflector comprising an opening, said parabolic reflector being configured to reflect and distribute a light beam in a homogenous manner, toward said opening; a transparent shield arranged to close said opening;
a bearing partition arranged in the parabolic reflector, so to define a first sector of the reflector and a second sector of the reflector opposed to each other with respect to said bearing partition;
at least a light source configured to generate:
a first light beam pointed toward said first sector of the reflector;
a second light beam pointed toward said second sector of the reflector;
a third light beam;
a mask comprising at least a partially transparent window arranged so that said third light beam illuminates said window.

In a first embodiment, the mask is arranged in front of the bearing partition and the third light beam is pointed toward said opening so to backlight the window. Thereby, the third light beam is substantially in front of the window.

In a second embodiment, the window comprises a perimeter edge and the third light beam is pointed so to light at least a portion of the perimeter edge of the window. Thereby, the third light beam provides for at least a pair of LEDs arranged on sides opposed to each other and pointed at the edge of the window, so that the third beam produced by the latter diffuses by refraction and illuminates the window.

Thereby, the headlight according to the invention allows to define independent reflector sections which generate diversified light beams. Furthermore, the provision of the mask with a window of variable conformation and shape, allows to conceive a position light or a Day Running Light (DRL), generated by lighting the window. The shape itself of the illuminated window therefore reproduces the conformation of the window. That is, an illuminated shape defined by the perimeter edge of the window.

In particular, the window may reproduce a commercial logo, or a symbol, which is illuminated by the third light beam. Thereby, the window, in addition to acting as lighting, characterizes the headlight with a symbol or logo of the manufacturer, or of the vehicle model.

The mask comprises an opaque portion which surrounds the window. Thereby, the light filters only through the window. The edges of the window delimit the opaque area from the transparent one. This allows to obtain a window homogenously illuminated without any light scattering. This allows a clear vision, even during the day, of the light image corresponding to the shape defined by the edge of the illuminated window.

In a preferred embodiment, the light source comprises: a first plurality of LED adapted to generate the first light beam, a second plurality of LED adapted to generate the second light beam, and a third plurality of LED adapted to generate the third light beam.

Advantageously, the first plurality of LED and the second plurality of LED are arranged on the bearing partition facing toward the parabolic reflector. This allows to provide a beam reflected by the reflector and directed towards the opening. The arrangement—i.e., the position in terms of angle with respect to the bearing partition—the power, the geometry of the LEDs allow to obtain a light beam with different features. In particular, by varying these parameters it is possible to produce a high beam or a low beam, or another type of beam.

More in detail, the first plurality of LED is arranged on a first portion of the bearing partition which is faced toward a base portion of the reflector opposite to said opening, to generate the first light beam. The second plurality of LED is arranged on a second portion of the bearing partition which is always faced toward the base of the reflector, to generate the second light beam. The first and the second portions are portions opposed to each other and with respect to a median plane X-X of the bearing partition.

Advantageously, the third plurality of LED is installed on the bearing partition, in a front portion. Alternatively, the third plurality of LED is installed at the edge of the mask, or the third plurality of LED is installed on the bearing partition and on the mask. The lighting of the window may be produced by a combination of LEDs arranged both on the bearing partition and on the mask, so as to obtain a homogenous lighting of the window.

Advantageously, the first plurality of LED and the second plurality of LED are arranged at least in part on a rear wall or on a respective lateral wall of the bearing partition, for example on the lower wall and on the upper wall. The LEDs of the first and second pluralities are oriented so to light the respective sector of the reflector.

In particular, the first light beam comprises a first source beam generated by the first plurality of LED which hits and is reflected on said first sector of the reflector and generates a first reflected beam pointed toward said opening. The first light beam is a high beam.

In particular, the second light beam comprises a second source beam generated by the second plurality of LED which hits and is reflected on the second sector of the reflector and generates a second reflected beam pointed toward said opening. The second light beam is a low beam.

In particular, the third light beam comprises a third source beam generated by the third plurality of LED pointed toward said opening. The third light beam is a position beam.

Advantageously, the third plurality of LED is arranged behind the window, in particular, the LEDs may be arranged in series with one another, so as to follow the conformation of the window. Thereby, the light beam directed towards the opening, and therefore in a front view, reproduces the shape itself of the window.

Preferably, the bearing partition extends between a first end and a second end, opposite to the first end, inside the parabolic reflector.

In particular, said bearing partition is transversally arranged from side to side in said parabolic reflector. The bearing partition is advantageously connected to the internal walls of the parabolic reflector. Thereby, the bearing partition is stably connected to the reflector.

In an embodiment, said window extends transversally, parallel to the bearing partition. Said bearing partition preferably extends horizontally, in a normal use position of the headlight.

In a preferred embodiment, the mask is arranged in front of the bearing partition and extends along the bearing partition for at least a section. In particular, the bearing partition is arranged in an intermediate position between the base portion of the reflector and the opening of the reflector.

DESCRIPTION OF THE DRAWINGS

These and other advantages will be more detailed in the following description of an embodiment given by way of indication and not by way of limitation, with reference to the accompanying drawings, in which.

DETAILED DESCRIPTION

Figure 1:
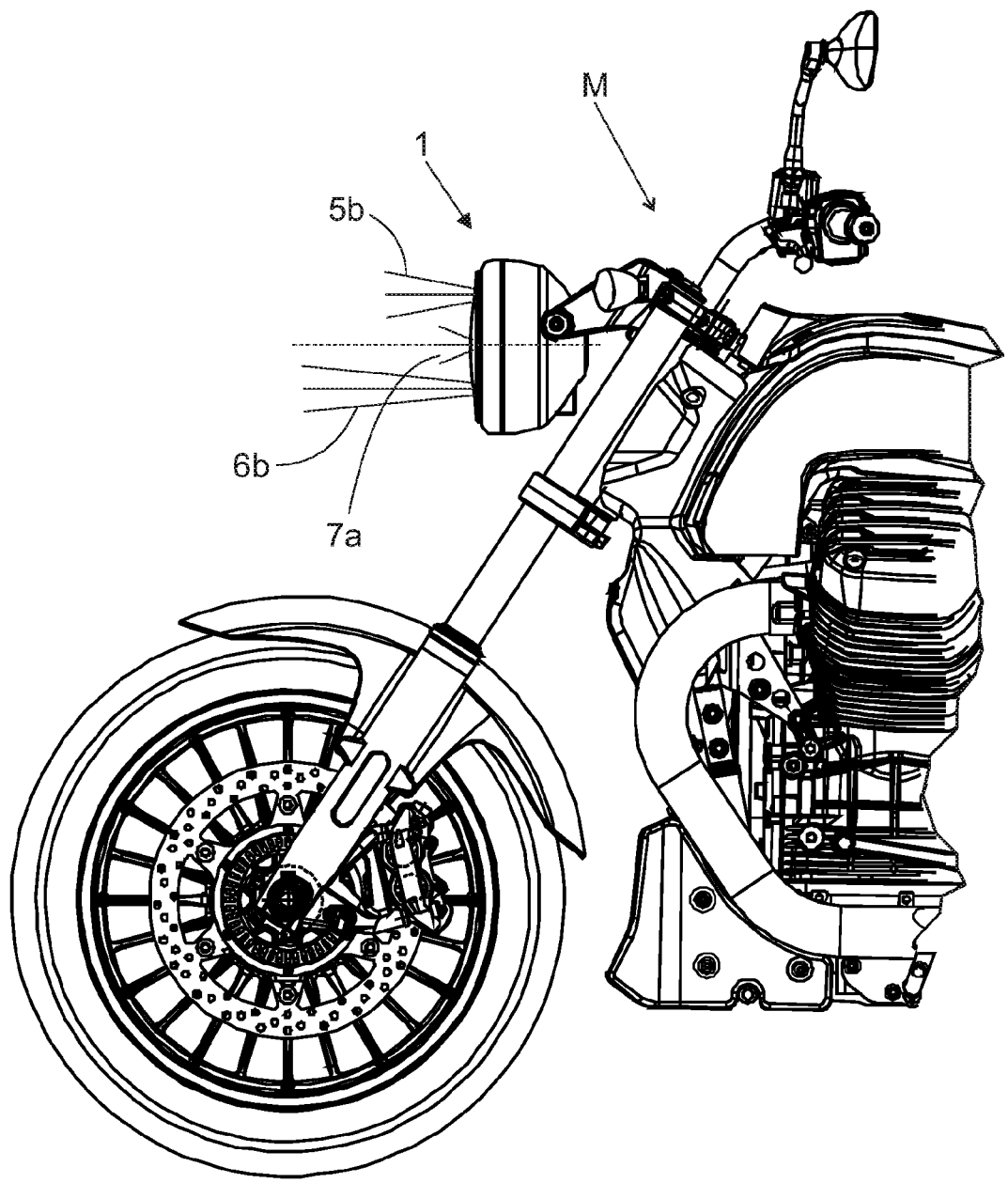
FIG. 1 shows a partial side view of a motorbike equipped with a headlight according to the present invention.

With reference to FIG. 1, a motor vehicle M equipped with the headlight 1 according to the present invention is partially shown. It is specified that the headlight, in particular a headlight with LEDs or another technology, is applicable to any vehicle/motor vehicle, in particular as a front headlight.

The headlight 1 includes a parabolic reflector 2 comprising a base portion 2b and an opening 2a, opposite to the base portion 2b. If necessary, also the base portion 2b may have an opening (not shown) for the passage of electric cables or other. The parabolic reflector 2 has an internal surface S configured to reflect and distribute in a homogenous manner, toward the opening 2a, at least a light beam 5b, 6b, and therefore frontally light the road.

It is understood that the function of the parabolic reflector 2 may also be carried out by a parabolic cap, or by other suitably shaped elements having the same function.

A transparent shield 3 is provided for to close the opening 2a, for example made of transparent or semitransparent glass or plastic material. The shield 3 is coupled with a base body of the headlight (not shown) or with the edge of the opening 2a itself to close it. For example, the shield 3 is mounted on an edge which externally or internally embraces the opening 2a fluid-tight.

Figure 3:
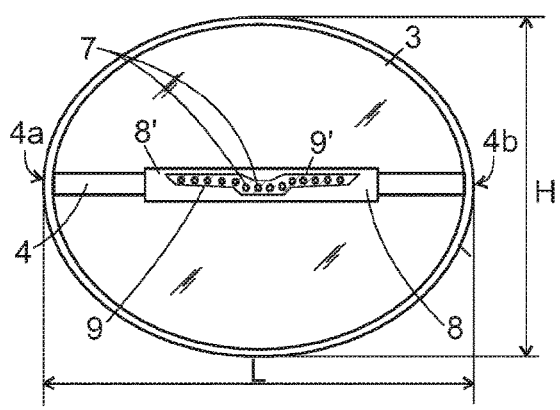
FIG. 3 shows a diagrammatic front view of the headlight according to the present invention.

The headlight 1 further comprises a bearing partition 4 arranged in the parabolic reflector 2 which extends between a first end 4a and a second end 4b, opposed to each other (FIG. 3). Thereby, the bearing partition 4 defines a first sector of the reflector 15 and a second sector of the reflector 16 opposed to each other with respect to the bearing partition 4, i.e., separate and distinct from the bearing partition 4.

The bearing partition later 4 shown in FIG. 2 has, for example, a polygonal section, in particular of a substantially rectangular shape. In particular, the bearing partition 4 is transversally arranged from side to side in the parabolic reflector 2, extending along the entire length L, and is connected to the internal lateral walls of the parabolic reflector 2 (FIG. 3). The partition is substantially in a median position, plane X-X, with respect to the height H of the reflector 2 and extends horizontally.

In a constructive variant, not shown, the bearing partition 4 may, for example, extend according to the height H of the reflector 2, defining a first and a second sector of the reflector, respectively, right and left.

The headlight 1 comprises at least a light source 5, 6, 7 which generates a first light beam 5a, a second light beam 6a, and a third light beam 7a distinct from one another.

The three light beams may be generated by a single light source which, for example, combined with reflection elements, gives rise to the three distinct light beams.

In a preferred embodiment, a first plurality of LED 5, adapted to generate the first light beam 5a pointed toward the first sector of the reflector 15, and a second plurality of LED 6, adapted to generate the second light beam 6a pointed toward the second sector of the reflector 16, are provided. Furthermore, a third plurality of LED 7, adapted to generate the third light beam 7a, is provided.

In addition, the headlight 1 comprises a mask 8 equipped with at least a partially transparent window 9 which is illuminated by the third light beam 7a.

In particular, the third light beam is directly oriented, without reflections, toward the window 9 of the mask 8.

In a first constructive variant, the mask 8 is arranged facing the third plurality of LED 7, generating the third light beam 7a—which is a source beam—pointed toward the opening 2a, which therefore passes through and illuminates the window 9 from behind (FIG. 3).

In other words, the third plurality of LED 7 is arranged behind the window 9 and the LEDs are arranged in series with one another so as to follow the conformation of the window 9.

Figure 4:
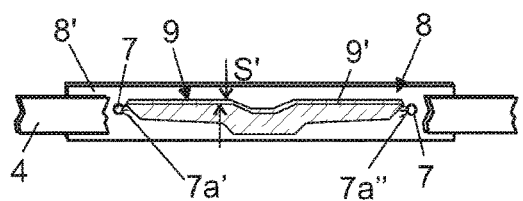
FIG. 4 shows a detailed view of the back of a mask of the headlight, according to the invention.

In an embodiment, shown in FIG. 4, the LED/s 7, preferably two, are arranged on the perimeter edge opposed to the window 9. In this case, the third light beam is defined by the individual light beams 7a', 7a" emitted by each of the LEDs 7, in a direction opposed with respect to one another, directed toward the center of the window 9. According to a known effect, the light beam propagates by refraction in the thickness S' of the transparent material which the window 9 is made of. In other words, the LEDs light the window 9 by refraction inside the thickness S'.

In general, the third plurality of LED may be installed on the edge of the bearing partition 4, or on the edge of the mask 8, or even partly on the edge of the bearing partition 4 and partly on the mask 8.

The mask 8 extends for at least a section along the bearing partition 4 (FIG. 3). The window 9 extends parallel to the bearing partition 4. Said window 9 is characterized by an edge 9' which defines the shape of a symbol or logo which is illuminated by the third light beam 7a. Being the third light beam 7a always switched-on (when the vehicle is switched-on), the vision of the logo or of the symbol which characterizes the make or model of the vehicle is possible both during the day and during the night, increasing the attractiveness and the distinguishability of the vehicle. The window 9 may be constituted by a transparent plastic or glass element, with a substantially flat portion delimited by the edge 9', inserted inside an opening of the mask 8 having a shape adapted to receive said flat portion. Since the visible surface (said portion delimited by the edge 9') of the window 9 is flat, this may have complex two-dimensional shapes, such as to be capable of reproducing symbols or logos as shown in FIGS. 3, 4 and 5.

The mask 8 is made of a non-transparent or opaque material in the portion 8' which surrounds the window 9. The edges 9' of the window delimit the opaque area from the transparent one. This allows to obtain a window 9 homogenously illuminated without any light scattering, and, above all, a light image identical to the shape defined by the edge 9' of the window 9.

In a particular version, the window has a parallelepiped shape which is entirely illuminated by the third light beam, and the opening shape of the opaque part of the mask allows the front view of only the portion of the window left visible from the opaque part.

In detail, the window 9, to fulfill the daylight or position function, has a minimum area of 25 cm$^2$, in accordance with industry regulations.

Figure 2:
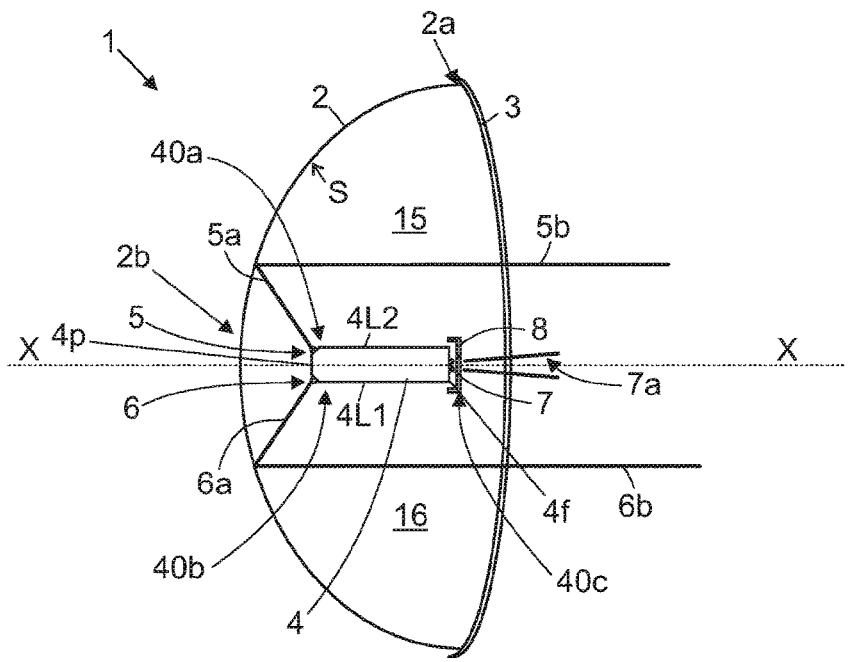
FIG. 2 shows a diagrammatic sectional side view of the headlight according to the present invention.

In other constructive aspects, as shown in FIG. 2, the first plurality of LED 5 is arranged on a first portion 40a of the bearing partition 4 which is faced toward the base 2b of the reflector, to generate the first light beam 5a.

The second plurality of LED 6 is arranged on a second portion 40b of the bearing partition 4 which is always faced toward the base 2b of the reflector, to generate the second light beam 6a.

The first 40a and the second 40b portions are portions opposed to each other with respect to a median plane X-X.

More in particular, the first plurality of LED 5 and the second plurality of LED 6 are arranged, at least in part, on a rear wall 4p of the bearing partition 4 and/or on a respective lateral wall 4L1, 4L2. The LEDs of the first and second plurality may therefore be arranged on the upper and lower walls of the bearing partition 4 (embodiment not shown). The rear wall 4p is, for example, a wall with inclined portions on which the LEDs are mounted oriented toward the respective sector of the reflector 15, 16 to illuminate it. In other words, the first and/or second plurality of LED may be inclined with respect to the extension of the bearing partition 4.

In detail, according to the operating principle, the first light beam comprises a source beam 5a which hits and is reflected on the surface affecting the first sector of the reflector 15 and generates a first reflected beam 5b pointed toward the opening 2a. The first light beam 5a is, for example, a high beam.

Similarly, the second light beam comprises a second source beam 6a which hits and is reflected on the surface affecting the second sector of the reflector 16 and generates a second reflected beam 6b pointed toward the opening 2a.

The second light beam 6a is, for example, a low beam.

Figure 5A:
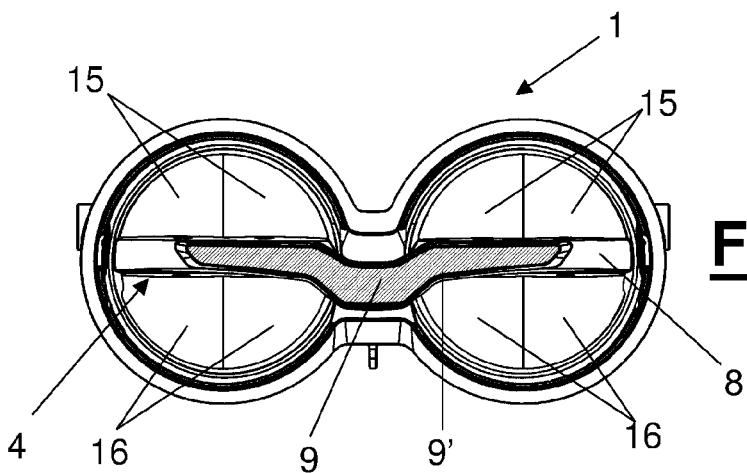
Figure 5B:
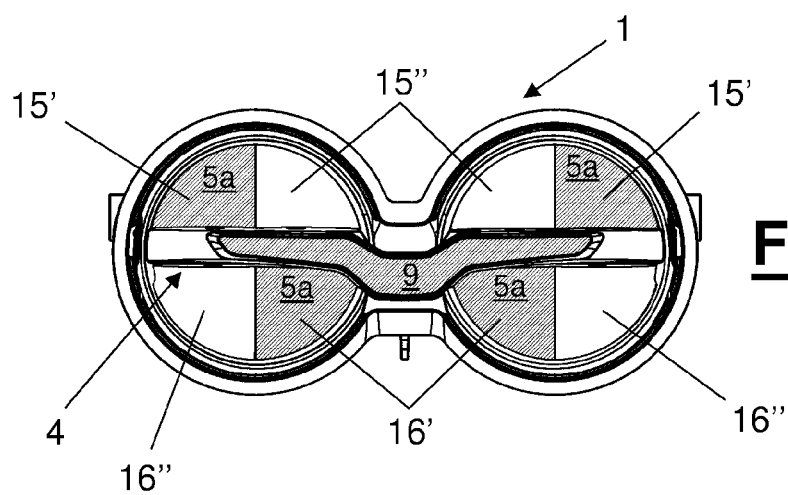

In a particular embodiment shown in FIG. 5B, said first light beam 5a generated by said first plurality of LED 5 (not shown in the Figure) is oriented both toward the first sector of the reflector 15 and toward the second sector of the reflector 16. Said first light beam 5a is adapted to light a first portion 15a of the first sector of the reflector 15 and a first portion 16a of the second sector of the reflector 16. Said first portions 15a, 16a being opposed to each other with respect to the center of the headlight 1, when the headlight 1 is viewed from the front.

Figure 5C:
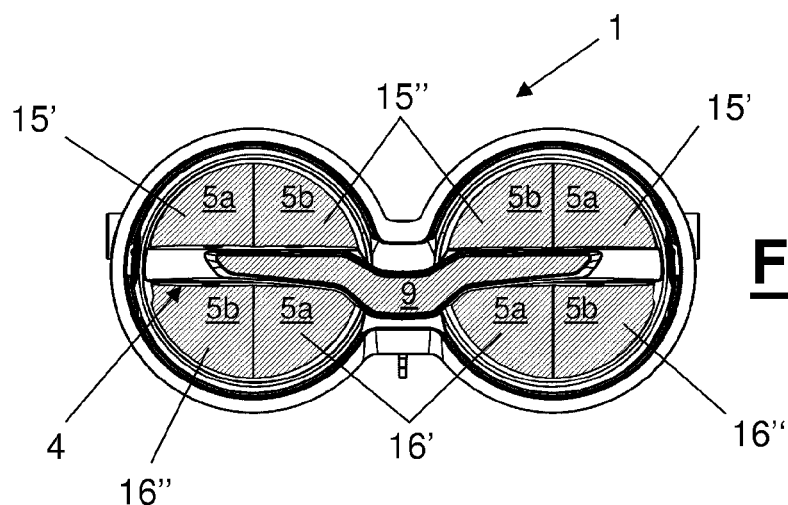

In this particular embodiment, as shown in FIG. 5C, said second light beam 6a generated by said plurality of LED 6 (not shown in the Figure) is oriented both toward the first sector of the reflector 15 and toward the second sector of the reflector 16. Said second light beam 6a is adapted to light a second portion 15b of the first sector of the reflector 15 and a second portion 16b of the second sector of the reflector 16. Said first portions 15a, 16a and said second portions 15b, 16b being complementary to each other so to completely light the headlight 1, when the headlight 1 is viewed from the front. In this particular embodiment, both the first plurality of LED 5 and the second plurality of LED 6 are arranged partly on the upper side and partly on the lower side of the bearing partition 4. This particular arrangement of the LEDs 5, 6 allows to eliminate the shadow which otherwise would be generated, due to the presence of the bearing partition 4, by only lighting the first sector of the reflector 15 or the second sector of the reflector 16.

As shown in FIG. 5A, the third light beam 7a is instead a direct source beam pointed toward the window 9 and acts as position light or Day Running Light (DRL), i.e., a daytime running light which is always switched-on when the vehicle is started (see FIGS. 5A, 5B, 5C). The window 9 delimited by the edge 9' is always visible when the vehicle is switched-on, therefore, the logo or symbol reproduced is backlit and the distinctiveness of the vehicle considerably increases even in the dark. Said logo or symbol are always visible since the third light beam 6a is a Day Running Light or a position light, therefore less intense with respect to a low beam or a high beam, and allows the clear distinction of the shape of the window 9 with the naked eye (without protective or sun glasses).

In order to obtain diversified light beams, for example, the high/low beam version of the light, it is necessary to take into account parameters such as: the geometry of the LEDs, the position, the power and the number of LEDs.

The above description of embodiments of the invention is capable of showing the invention from the conceptual point of view so that others, using the background art, may be capable of modifying and/or adapting in various applications such specific embodiments without further research and without departing from the inventive concept, and, therefore, it is understood that such adaptations and/or modifications will be considered as equivalent to specific embodiments. The means and materials used to carry out the various functions described may be of various nature without departing from the scope of the invention. It is understood that the expressions or the terminology used are purely descriptive and, therefore, not limitative.

The invention claimed is:

1. Headlight for a vehicle comprising:
    a parabolic reflector comprising an opening, said parabolic reflector being configured to reflect and distribute in a homogenous manner toward the opening a light beam;
    a transparent shield to close said opening;
    a bearing partition arranged in the parabolic reflector, so to define a first sector of the reflector and a second sector of the reflector opposed each other with respect to said bearing partition;

a light source configured to generate:
  a first light beam pointed toward said first sector of the reflector;
  a second light beam pointed toward said second sector of the reflector;
  a third light beam; and
a mask comprising a window partially transparent and an opaque portion which surrounds said window;
wherein said mask is arranged in front of said bearing partition and the third light beam is pointed toward said opening so to backlight said window,
wherein said window comprises an edge shaped so to outline a symbol or a logo; and
wherein said light source comprises:
  a first plurality of LEDs configured to generate said first light beam,
  a second plurality of LEDs configured to generate said second light beam, and
  a third plurality of LEDs configured to generate said third light beam.

2. Headlight according to claim 1, wherein said third light beam acts as position light or day running light.

3. Headlight according to claim 1, wherein said third light beam is always switched-on when the vehicle is in drive.

4. Headlight according to claim 1, wherein the third light beam is pointed so to light a portion of the perimeter edge of the window.

5. Headlight according to claim 1, wherein said third plurality of LEDs is installed on said bearing partition or on said mask.

6. Headlight according to claim 5, wherein said first plurality of LEDs and said second plurality of LEDs are arranged on said bearing partition facing toward said parabolic reflector.

7. Headlight according to claim 1, wherein said first plurality of LEDs is arranged on a first portion of said bearing partition which is faced toward said parabolic reflector, and said second plurality of LEDs is arranged on a second portion of said bearing partition which is faced toward said parabolic reflector, in particular the first portion and the second portion are opposed to each other with respect to a median plane, the first plurality of LEDs and the second plurality of LEDs are arranged in part on a rear wall and/or on a respective lateral wall of the bearing partition, the LEDs of the first and second plurality (5, 6) are oriented so to light respective sectors of the parabolic reflector.

8. Headlight according to claim 1, wherein said bearing partition is transversally arranged from side to side in the parabolic reflector, the bearing partition being connected to the internal lateral walls of said parabolic reflector.

9. Headlight according to claim 1, wherein said first light beam is a low beam, and said second light beam together with said first light beam are a high beam.

10. A motor vehicle, comprising a headlight according to claim 1 arranged frontally.

* * * * *